United States Patent
Andersen et al.

(10) Patent No.: US 11,402,039 B2
(45) Date of Patent: Aug. 2, 2022

(54) VENTING TUBE ARRANGEMENT

(71) Applicant: Builder's Best, Jacksonville, TX (US)

(72) Inventors: John L. Andersen, Tyler, TX (US); Aaron Matthew Lowe, Tatum, TX (US)

(73) Assignee: Builder's Best, Jacksonville, TX (US)

( * ) Notice: Subject to any disclaimer, the term of this patent is extended or adjusted under 35 U.S.C. 154(b) by 299 days.

(21) Appl. No.: 16/721,105

(22) Filed: Dec. 19, 2019

(65) Prior Publication Data
US 2020/0208758 A1 Jul. 2, 2020

Related U.S. Application Data

(60) Provisional application No. 62/784,990, filed on Dec. 26, 2018.

(51) Int. Cl.
*F16L 11/11* (2006.01)
*F16L 25/00* (2006.01)

(52) U.S. Cl.
CPC ......... *F16L 11/111* (2013.01); *F16L 25/0036* (2013.01)

(58) Field of Classification Search
CPC .. B21C 37/124; B21C 37/121; F16L 11/1111; F16L 11/15; F16L 11/16; F16L 25/0036; F16L 9/165
USPC ....... 138/118, 119, 129, 121, 122, 130, 154; 72/49, 50, 142; 29/505, 243.58, 819
See application file for complete search history.

(56) References Cited

U.S. PATENT DOCUMENTS

| | | | | |
|---|---|---|---|---|
| 2,337,374 A | * | 12/1943 | Chernack | F16L 11/24 138/134 |
| 3,857,159 A | * | 12/1974 | Davis | F16L 9/165 29/429 |
| 5,165,732 A | * | 11/1992 | Townsend | F16L 13/163 126/307 R |
| 5,660,912 A | * | 8/1997 | Menzel | F16L 1/00 138/122 |
| 7,520,302 B2 | * | 4/2009 | Smith | F16L 11/1185 138/118 |
| 8,915,266 B2 | * | 12/2014 | Diels | H02G 3/0468 138/122 |

* cited by examiner

*Primary Examiner* — Patrick F Brinson
(74) *Attorney, Agent, or Firm* — Price Heneveld LLP

(57) ABSTRACT

A collapsible conduit includes an elongated sheet configured as a coil, the coil having a longitudinal axis, the elongated sheet having a first edge that includes a first hem and a second edge opposite the first edge and that includes a second hem, each hem including an overlapping portion that overlaps with the overlapping portion of the other hem, the first hem interlocked with the second hem to form an interlocking arrangement between the first and second edges, wherein the conduit is collapsible along the longitudinal axis between fully extended and collapsed positions, and wherein the overlapping portion of the each hem has an arcuate cross-section shape when the conduit is in both the fully extended and collapsed positions.

19 Claims, 2 Drawing Sheets

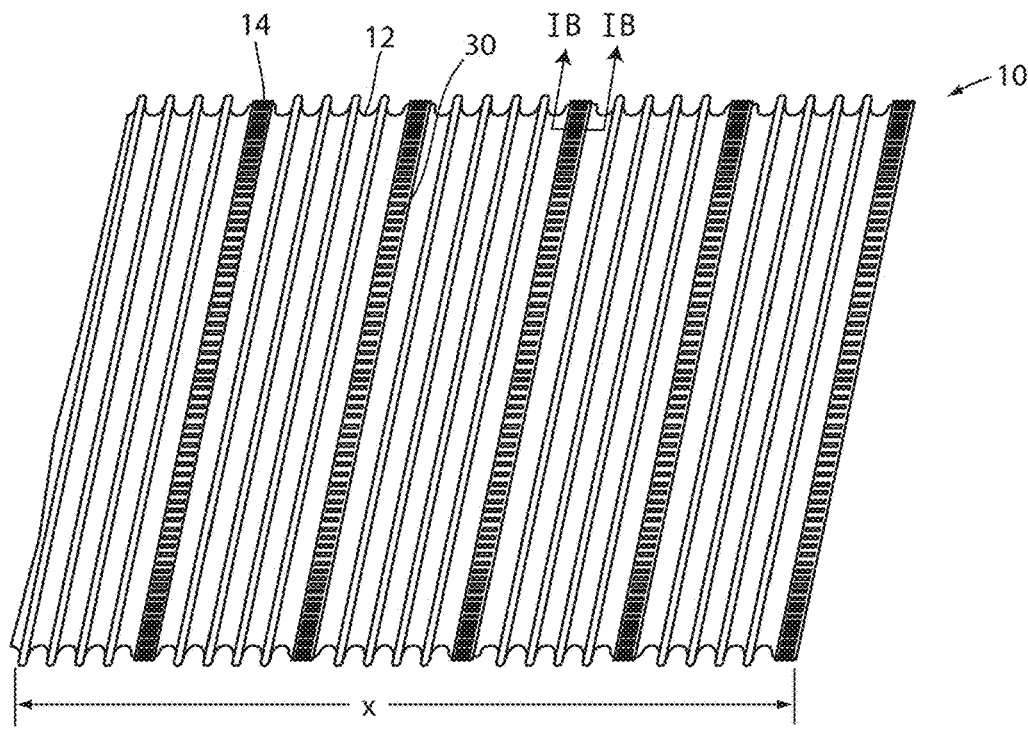
FIG. 1A
Prior Art
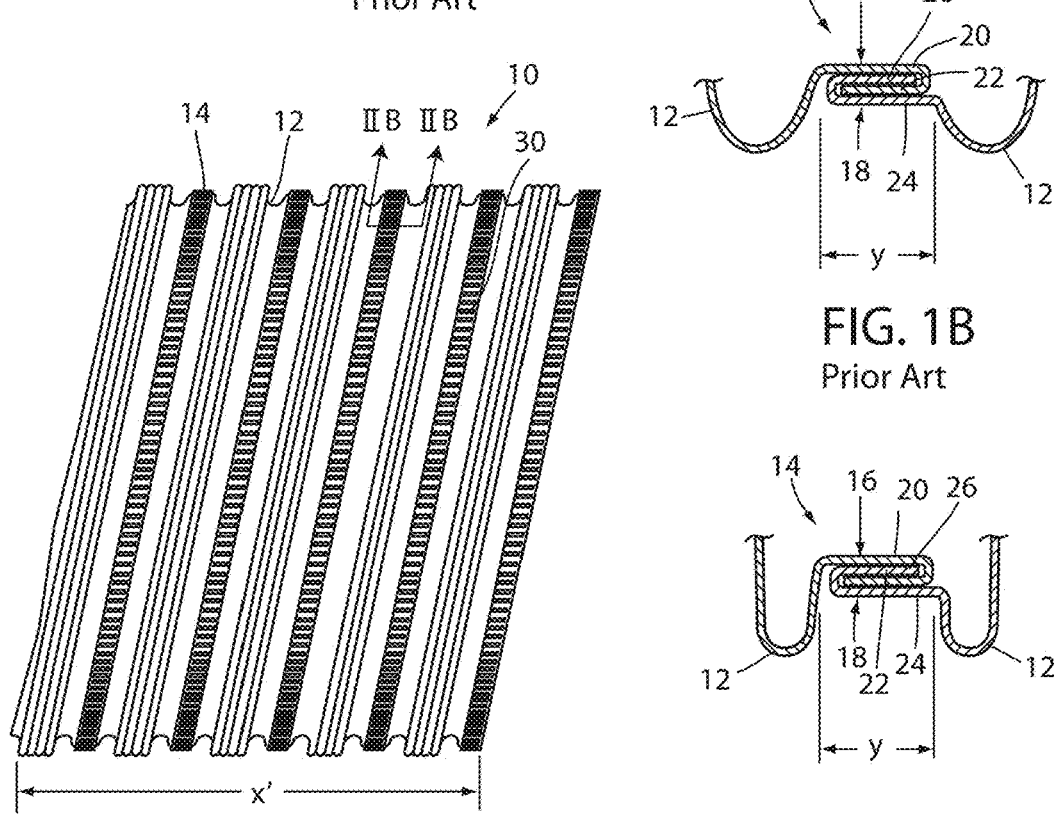
FIG. 2A
Prior Art
FIG. 1B
Prior Art
FIG. 2B
Prior Art

VENTING TUBE ARRANGEMENT

CROSS-REFERENCE TO RELATED APPLICATION

This application claims the benefit of U.S. Provisional Patent Application No. 62/784,990, filed on Dec. 26, 2018, entitled "VENTING TUBE ARRANGEMENT," the entire disclosure of which is incorporated herein by reference.

BACKGROUND

The embodiments as disclosed herein relate to a venting tube arrangement, and in particular to a venting tube arrangement comprising a collapsible conduit that includes an edge interlocking arrangement allowing for extension and a relatively compact collapsing of the conduit.

SUMMARY

One embodiment includes a collapsible conduit that includes an elongated sheet configured as a coil, the coil having a longitudinal axis, the elongated sheet having a first edge that includes a first hem and a second edge opposite the first edge and that includes a second hem, each hem including an overlapping portion that overlaps with the overlapping portion of the other hem, the first hem interlocked with the second hem to form an interlocking arrangement between the first and second edges, wherein the conduit is collapsible along the longitudinal axis between fully extended and collapsed positions, and wherein the overlapping portion of the each hem has an arcuate cross-section shape when the conduit is in both the fully extended and collapsed positions.

Another embodiment includes a collapsible conduit that includes an elongated sheet configured as a coil, the coil having a longitudinal axis, the elongated sheet having a body portion, a first edge extending along the body portion and second edge extending along the body portion opposition the first edge, the first edge including a first hem, the second edge including a second hem, each hem including a bend located at an outermost edge of the hem and an overlapping portion that extends from the bend back toward the body portion of the sheet, wherein the overlapping portion of the first hem overlaps with and abuts the overlapping portion of the second hem to form an interlocking arrangement, wherein the conduit is collapsible along the longitudinal axis between a fully extended position and a fully collapsed position, and wherein the overlapping portion of the each hem has an arcuate cross-section shape when the coil is in both the fully extended and collapsed positions.

Still another embodiment includes a method for constructing a collapsible conduit, the method including providing an elongated sheet having a first edge and second edge, forming a first hem in the first edge of the sheet, the first hem having a first overlapping portion, the first overlapping portion having a substantially planer cross-sectional configuration, forming a second hem in the second edge of the sheet, the second hem having a second overlapping portion, the second overlapping portion having a substantially planar cross-sectional configuration, and overlapping the first and second overlapping portions with one another. The method further includes forming an interlocking arrangement between the first and second edges by bending the first and second overlapping portions from the planar cross-sectional configuration to an arcuate cross-sectional configuration, thereby forming the conduit from the elongated sheet, wherein the conduit is collapsible along the longitudinal axis between fully extended and collapsed positions, and wherein the overlapping portion of the each hem has an arcuate cross-section shape when the coil is in both the fully extended and collapsed positions.

These and other features, advantages, and objects of the present invention will be further understood and appreciated by those skilled in the art by reference to the following specification, claims, and appended drawings.

BRIEF DESCRIPTION OF THE DRAWINGS

FIG. 1A is a side elevational view of the prior art conduit in a fully extended position or configuration;

FIG. 1B is an enlarged cross-sectional view of the prior art conduit of FIG. 1A taken along the line IB-IB, FIG. 1A;

FIG. 2A is the prior art conduit of FIG. 1A shown in a fully collapsed position;

FIG. 2B is an enlarged cross-sectional view of the prior art conduit of FIG. 2A taken along the line IIB-IIB, FIG. 2A;

DETAILED DESCRIPTION

Figure 3A:
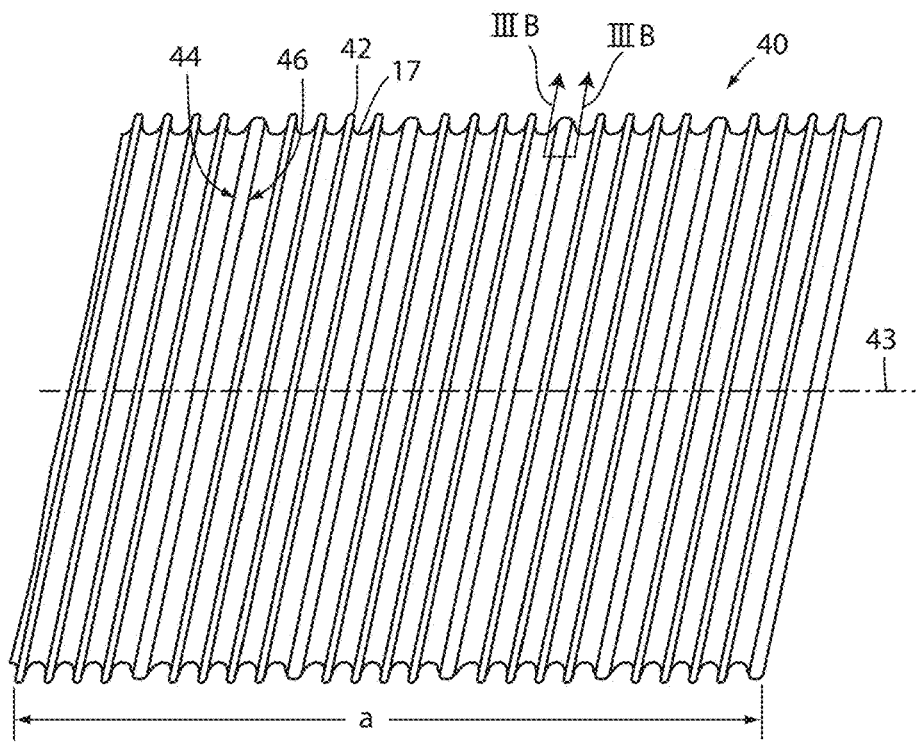
FIG. 3A is a side view of an embodiment of the present inventive conduit in a fully extended position.

For purposes of description herein, the terms "upper," "lower," "right," "left," "rear," "front," "vertical," "horizontal," and derivatives thereof shall relate to the invention as oriented in FIG. 3A. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other characteristics relating to the embodiments disclosed herein are not to be considered as limiting, unless the claims expressly state otherwise.

The reference numeral 10 (FIG. 1A) generally designates a prior art conduit reconfigurable between a fully extended configuration having a length x, and a fully collapsed configuration having a length x' (FIG. 2A). The conduit 10 includes a corrugated band material 12 connected via a seam 14 spiraling along the length of the conduit 10. As best illustrated in FIG. 1B the seam 14 includes a pair of interlocking edges 16, 18. The edge 16 includes a first portion 20 and a second portion 22 folded back toward the first portion 20, while the edge 18 includes a first portion 24 and a second portion 26 folded back toward the first portion 24. It is noted that the first and second portions 20, 22 of the edge 16 and the first and second portions 24, 26 of the edge 18 are planar in cross-section. The first and second portions of the edge 16 and the first and second portions 24, 26 of the edge 18 are interspaced with one another and held together via a crimping or knurl 30. As noted above, the prior art conduit is collapsible from a fully extended position or configuration having a length x as shown in FIG. 1A to a fully compressed configuration having a length x' as shown in FIG. 2A. As best illustrated in FIGS. 1B and 2B, the first and second portions of the end 16 and the first and second portions of the edge 18 remain planar when the prior art conduit 10 is in the fully collapsed configuration, and the width of the seam 14 remains a distance y.

Figure 3B:
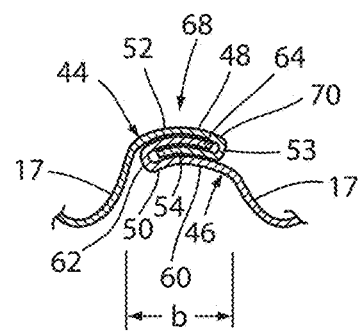
FIG. 3B is an enlarged cross-sectional side view of the conduit of FIG. 3A taken along the line IIIB-IIIB, FIG. 3A.
Figure 4A:
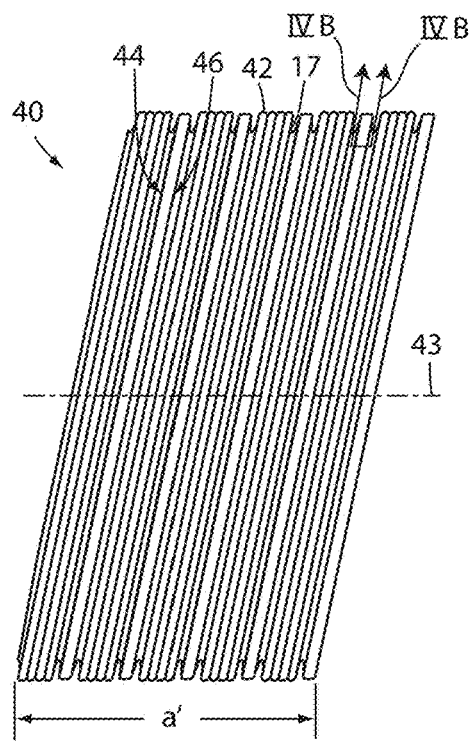
FIG. 4A is a side elevational view of the conduit of FIG. 3A shown in a fully collapsed configuration.
Figure 4B:
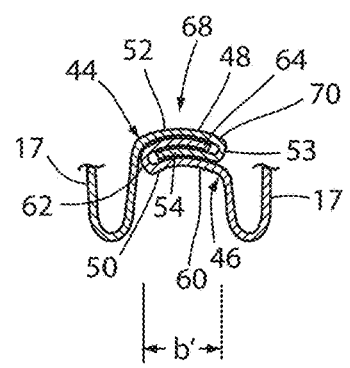
FIG. 4B is an enlarged cross-sectional side view of the conduit of FIG. 4A taken along the line IVB-IVB, FIG. 4A.

As best illustrated in FIGS. 3A and 3B, one embodiment of the conduit 40 includes an elongated sheet 42 formed into a coil defining an elongated axis 43. In the illustrated example, the sheet 42 comprises aluminum, however other suitable materials may also be utilized. In the illustrated example, the elongated sheet has a body portion 17, a first edge 44 and a second edge 46 that are connected to one another via a seam or interlocking arrangement 68. The first edge 44 includes a first hem 48 while the second edge 46 includes a second hem 50. The first hem 48 includes a lead portion 52, a bend 53 located at an outermost edge of the hem 48, and an overlapping portion 54 extending back toward the body portion 17 of the elongate sheet 42. The second hem 50 includes a lead portion 60, a bend 62 located at an outermost edge of second hem 50, and an overlapping portion 64 extending from the bend 62 back toward the body portion 17. The lead portion 52, the over lapping portion 54, the lead portion 60 and the overlapping portion 64 are interspaced with one another and bent into an arcuate cross-sectional configuration, thereby forming the interlocking arrangement or seam 68 that forms a helix about the axis 43. The interlocking arrangement 68 has a width b when the conduit 40 is in the fully extended configurations to the length a, and a reduced width b' that is less than the width b when the conduit 40 is in the fully contracted configuration to the length a'. The configuration of and the collapsible nature of the interlocking arrangement 68 provides a stronger connection relative to the prior art attachment method previously utilized, thereby providing the conduit with an increased resistance to crushing or structural collapse. The interlocking arrangement 68 also provides greater compaction of the conduit 40 relative to prior art arrangements, thereby allowing for a decrease in overall shipping size. For example, a prior art conduit of a length x would be collapsible to a collapsed configuration of x', as discussed above, while the collapsible conduit 40 may be reconfigured from a fully extended configuration having a length a to a fully collapsed configuration having a length a', where the length a' is significantly less than the length x'. It is noted that the arcuate configuration of the interlocking arrangement 68 allows the seam 68 to further compress from a width of b in a non-compressed or extend configuration to a lesser width of b' in a compressed configuration.

It is noted that the configuration(s) of the embodiments of the conduit as included are examples only, and that the precise configuration of the conduit may include seam arrangements that are wider or narrower relative to those shown, may include seams forming differently-angled helical patterns about and along the relative longitudinal axis, may include more or less corrugations between seams, and the like.

The above description is considered that of the preferred embodiments only. Modifications of the embodiments disclosed herein will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. A collapsible conduit, comprising:
an elongated sheet configured as a coil, the coil having a longitudinal axis, the elongated sheet having a first edge that includes a first hem and a second edge opposite the first edge and that includes a second hem, each hem including an overlapping portion that overlaps with the overlapping portion of the other hem, the first hem interlocked with the second hem to form an interlocking arrangement between the first and second edges, wherein the conduit is collapsible along the longitudinal axis between fully extended and collapsed positions, and wherein the overlapping portion of the each hem has an arcuate cross-section shape when the conduit is in both the fully extended and collapsed positions, and wherein the interlocking arrangement does not include mechanical fasteners separate from the sheet.

2. The collapsible conduit of claim 1, wherein each hem is a single hem.

3. The collapsible conduit of claim 1, wherein the interlocking arrangement forms a helix about the longitudinal axis.

4. The collapsible conduit of claim 1, wherein the conduit comprises at least one corrugated portion extending along a length thereof.

5. The collapsible conduit of claim 2, wherein both the interlocking arrangement and the corrugated portion are collapsible along the longitudinal axis.

6. The collapsible conduit of claim 1, wherein a majority of an outer surface of the interlocking arrangement is substantially free from irregularities.

7. The collapsible conduit of claim 1, wherein the elongated sheet comprises a metal.

8. The collapsible conduit of claim 7, wherein the metal comprises aluminum.

9. A collapsible conduit, comprising:
an elongated sheet configured as a coil, the coil having a longitudinal axis, the elongated sheet having a body portion, a first edge extending along the body portion and second edge extending along the body portion opposition the first edge, the first edge including a first hem, the second edge including a second hem, each hem including a bend located at an outermost edge of the hem and an overlapping portion that extends from the bend back toward the body portion of the sheet, wherein the overlapping portion of the first hem overlaps with and abuts the overlapping portion of the second hem to form an interlocking arrangement, wherein the conduit is collapsible along the longitudinal axis between a fully extended position and a fully collapsed position, and wherein the overlapping portion of the each hem has an arcuate cross-section shape when the coil is in both the fully extended and collapsed positions, and wherein the interlocking arrangement is free from mechanical fasteners separate from the sheet.

10. The collapsible conduit of claim 9, wherein each hem is a single hem.

11. The collapsible conduit of claim 9, wherein the interlocking arrangement forms a helix about the longitudinal axis.

12. The collapsible conduit of claim 9, wherein the conduit includes at least one corrugated portion extending along a length thereof.

13. The collapsible conduit of claim 9, wherein an outer surface of the interlocking arrangement is substantially free from irregularities.

14. The collapsible conduit of claim 9, wherein the elongated sheet comprises a metal.

15. The collapsible conduit of claim 14, wherein the metal comprises aluminum.

16. A method for constructing a collapsible conduit, comprising:

provide an elongated sheet having a first edge and second edge;

forming a first hem in the first edge of the sheet, the first hem having a first overlapping portion, the first overlapping portion having a substantially planer cross-sectional configuration;

forming a second hem in the second edge of the sheet, the second hem having a second overlapping portion, the second overlapping portion having a substantially planar cross-sectional configuration;

overlapping the first and second overlapping portions with one another; and forming an interlocking arrangement between the first and second edges by bending the first and second overlapping portions from the planar cross-sectional configuration to an arcuate cross-sectional configuration, thereby forming the conduit from the elongated sheet; and wherein the conduit is collapsible along the longitudinal axis between fully extended and collapsed positions, and wherein the overlapping portion of the each hem has an arcuate cross-section shape when the coil is in both the fully extended and collapsed positions, and wherein the interlocking arrangement does not include mechanical fasteners separate from the sheet.

17. The method for constructing the collapsible conduit of claim 16, wherein each hem is a single hem.

18. The method for constructing the collapsible conduit of claim 16, wherein the conduit includes a corrugated portion, and wherein both the interlocking arrangement and the conduit are collapsible along the longitudinal axis.

19. The method for constructing the collapsible conduit of claim 16, wherein the interlocking arrangement forms a helix about the longitudinal axis.

\* \* \* \* \*

UNITED STATES PATENT AND TRADEMARK OFFICE
CERTIFICATE OF CORRECTION

| | |
|---|---|
| PATENT NO. | : 11,402,039 B2 |
| APPLICATION NO. | : 16/721105 |
| DATED | : August 2, 2022 |
| INVENTOR(S) | : Andersen et al. |

It is certified that error appears in the above-identified patent and that said Letters Patent is hereby corrected as shown below:

In the Specification

Column 1, Line 39:
"opposition" should be — opposite —

Column 1, Line 57:
"planer" should be — planar —

Column 3, Line 19:
"over lapping" should be — overlapping —

In the Claims

Column 4, Claim 9, Line 39:
"opposition" should be — opposite —

Column 5, Claim 16, Line 9:
"planer" should be — planar —

Column 5, Claim 16, Line 16:
Delete "and"

Signed and Sealed this
Twenty-first Day of March, 2023

Katherine Kelly Vidal
*Director of the United States Patent and Trademark Office*